United States Patent
Kim et al.

(10) Patent No.: US 9,368,791 B2
(45) Date of Patent: Jun. 14, 2016

(54) CATHODE ACTIVE MATERIAL, METHOD FOR PREPARING THE SAME, AND LITHIUM SECONDARY BATTERIES INCLUDING THE SAME

(71) Applicant: Samsung SDI Co., Ltd., Yongin-si, Gyeonggi-do (KR)

(72) Inventors: Jiyoon Kim, Chungcheongnam-do (KR); Kitae Kim, Gyeonggi-do (KR); Dongwook Shin, Chungcheongnam-do (KR); Hyung Cheoul Shim, Chungcheongnam-do (KR); Hayeon Lee, Gyeonggi-do (KR); SungNim Jo, Seoul (KR); Haein Cho, Chungcheongnam-do (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 203 days.

(21) Appl. No.: 14/095,764

(22) Filed: Dec. 3, 2013

(65) Prior Publication Data

US 2014/0162127 A1 Jun. 12, 2014

(30) Foreign Application Priority Data

Dec. 6, 2012 (KR) .................. 10-2012-0140715

(51) Int. Cl.
*H01M 4/36* (2006.01)
*H01M 4/505* (2010.01)
(Continued)

(52) U.S. Cl.
CPC .............. *H01M 4/366* (2013.01); *H01M 4/505* (2013.01); *H01M 4/525* (2013.01); *H01M 4/582* (2013.01); *H01M 4/5825* (2013.01); *Y02E 60/122* (2013.01)

(58) Field of Classification Search
CPC ...... H01M 4/366; H01M 4/505; H01M 4/525
USPC ......................... 427/126.1; 429/224
See application file for complete search history.

(56) References Cited

U.S. PATENT DOCUMENTS

| 8,187,752 B2 | 5/2012 | Buckley et al. |
| 2006/0051673 A1* | 3/2006 | Johnson et al. ............... 429/224 |

(Continued)

FOREIGN PATENT DOCUMENTS

| KR | 1020060109305 A | 10/2006 |
| KR | 1020100060363 A | 6/2010 |
| KR | 1020120068826 A | 6/2012 |

OTHER PUBLICATIONS

European Search Report in counterpart European Application No. 13005678.1, mailed on Mar. 3, 2014 (9 pages).

(Continued)

*Primary Examiner* — Helen O Conley
*Assistant Examiner* — Victoria Lynch
(74) *Attorney, Agent, or Firm* — Lee & Morse, P.C.

(57) ABSTRACT

The present invention relates to a cathode active material for a lithium secondary battery, a method for preparing the same, and a lithium secondary battery including the same, and provides a cathode active material including: a lithium manganese-excess layered structure composite oxide represented by Formula $Li[Li_{x-z}(Ni_aCo_bMn_c)_{1-x}]O_{2-y}F_y$ (here, a+b+c=1, $0.05 \leq x \leq 0.33$, $0 \leq y \leq 0.08$, and $0 < z \leq 0.05$); a metal fluoride coating layer coated on a surface of the composite oxide; and a metal phosphate coating layer coated on the metal fluoride coating layer.

21 Claims, 4 Drawing Sheets

\<COMPARATIVE EXAMPLE 1\>

\<EXAMPLE 1\>

(51) Int. Cl.
  *H01M 4/525* (2010.01)
  *H01M 4/58* (2010.01)

(56) References Cited

U.S. PATENT DOCUMENTS

| | | | |
|---|---|---|---|
| 2006/0083991 | A1 | 4/2006 | Ahn et al. |
| 2006/0147809 | A1 | 7/2006 | Amine et al. |
| 2009/0087362 | A1 | 4/2009 | Sun et al. |
| 2010/0247986 | A1* | 9/2010 | Toyama et al. ............... 429/61 |
| 2011/0151328 | A1 | 6/2011 | Chang et al. |
| 2011/0165463 | A1 | 7/2011 | Chang et al. |

OTHER PUBLICATIONS

Jaephil Chao et al.; "Synthesis, Thermal and Electrochemical Properties of AlPO4 Coated LiNi0.8Co.1Mn0.102 Cathode Materials for Li-Ion Cell", Journal of the Electrochemical Society, vol. 151, No. 11, pp. A1899-A1904; Oct. 21, 2004 (6 pages).

Y, Wu et al; "Surface Modification of High Capacity Layered Li Li0.2Mn0.54Ni0.13Co0.13 02 Cathodes by AlP04", Journal of the Electrochemical Society, Manchester, New Hampshire; US, vol. 155, No. 9, pp. A635-A641; ISSN: 0013-4651, DOI: 10.1149/1.2948350, retrieved from the internet: URL:http://www.efrc.nano.utexas.edu/wp-content/uploads/2010/02/Manthiram-et-al__J-Electrochem-2008.pdf [retrieved on Jul. 11, 2008]; Jan. 1, 2008 (7 pages).

Y.-K. Sun, et al., "AlF3-Coating to Improve High Voltage Cycling Performance of Li[Ni1/3Co1/3Mn1/3]O2 Cathode Materials for Lithium Secondary Batteries," Journal of the Electrochemical Society, vol. 154, pp. A168-A172 (5 pages).

* cited by examiner

CATHODE ACTIVE MATERIAL, METHOD FOR PREPARING THE SAME, AND LITHIUM SECONDARY BATTERIES INCLUDING THE SAME

CROSS-REFERENCE TO RELATED APPLICATIONS

This application claims priority to and the benefit of Korean Patent Application No. 10-2012-0140715 filed in the Korean Intellectual Property Office on Dec. 6, 2012, the entire contents of which are incorporated herein by reference.

TECHNICAL FIELD

The present invention relates to a cathode active material for a lithium secondary battery, a method for preparing the same, and a lithium secondary battery including the same, and more particularly, to a technology which may reduce an initial irreversible capacity, enhance a rate capability, and improve service life characteristics by doubly coating a surface of a lithium manganese-excess layered structure composite oxide with a metal fluoride and a metal phosphate.

BACKGROUND ART

As lithium secondary batteries are widely used ranging from small-sized electronic devices to electric vehicles, power storage devices, and the like, there is an increasing demand for a cathode material for a secondary battery having high safety, a long service life, high energy density and high output characteristics.

In this regard, a lithium-excess layered structure lithium metal composite oxide is a cathode active material having a high capacity of 240 mAh/g or more per unit weight, and has been highlighted as a cathode material for a next-generation electric vehicle and power storage, which requires high capacity characteristics.

However, the lithium-excess layered structure lithium metal composite oxide has a high irreversible capacity caused by the phase change during the first charge and discharge so that it is difficult to implement a high discharge capacity, and is disadvantageous in that the service life thereof is rapidly decreased due to the elution of manganese ions and side reactions with electrolyte at high temperature. Further, there is a risk that the lithium-excess layered structure lithium metal composite oxide may be reacted with an electrolyte at high temperature to cause fire or explosion when used in a lithium secondary battery due to the structural instability occurring in a high charge state.

Accordingly, in order to implement a cathode material composed of a lithium-excess layered structure composite oxide, which reduces an initial irreversible capacity of the lithium-excess layered structure composite oxide, has excellent high rate capability, and may be used for a long time, attempts have been made to suppress side reactions with an electrolyte and enhance structural stability by coating various materials on a surface of a cathode active material.

Among them, it is known that a coating with metal/metal oxide/metal fluoride, and the like enhances electrochemical characteristics of the cathode active material, and particularly, it is reported that a coating of a metalloid fluoride such as $AlF_3$ greatly enhances electrochemical characteristics of a layered structure compound (see Non-Patent Document 1, and the like).

In particular, Patent Document 1 discloses a technology that prevents service life characteristics of a battery, particularly, performances thereof from deteriorating at high pressure and high rate by wet-coating a surface of a cathode active material for a lithium secondary battery with a finely powdered fluorine compound. In addition, Patent Document 2 briefly discloses that a metal fluoride or a metalloid fluoride may be used in a coating by using a solution based precipitation approach using an aqueous solvent while referring to Patent Document 1.

Furthermore, Patent Document 2 introduces that "the use of metal oxide or metal phosphate coatings has been described in published U.S. patent application 2006/0147809 to Amine et al. (the '809 application), entitled "Long Life Lithium Batteries with Stabilized Electrodes," incorporated herein by reference. Specifically for active materials with a spinel or olivine crystal structure, the '809 application specifically describes coatings comprising $ZrO_2$, $TiO_2$, $WO_3$, $Al_2O_3$, $MgO$, $SiO_2$, $AlPO_4$, $Al(OH)_3$, or mixtures thereof".

Meanwhile, the inventors of Patent Document 1 describe in Patent Document 3 that as a coating is performed by spraying a coating composition for a surface treatment while a lithium-containing compound is heated, a structural transfer occurring on the surface of a cathode active material finally obtained is prevented, while indicating a problem of a wet coating method of a metal fluoride disclosed in Patent Document 1, and the like as in "since a powder of a coating-treated cathode active material forms aggregates so that a particle size distribution is changed, and the composition and structure of the surface of the cathode active material are changed due to excessive contact with water or an organic-based solvent, the coating effect is not exhibited 100%" or "lithium in excess is easily dissolved in water or an organic solvent and thus causes a structural transfer of the cathode active material to reduce electrochemical characteristics" when the coating is performed by a wet coating method as in Patent Document 1.

Further, the inventors of Patent Document 1 disclose in Non-Patent Document 1 that when coated on the surface of a cathode active material, a metal fluoride and a metal oxyfluoride protect the cathode active material from hydrofluoric acid present in an electrolyte to maintain the crystal structure of the cathode active material well, and increase the drift velocity of lithium ions from the electrolyte to the cathode active material to decrease an increase in internal resistance.

CITATION LIST

Patent Document (Patent Document 1) KR10-0822013 B
(Patent Document 2) KR10-2012-68826 A
(Patent Document 3) KR10-2010-60363 A

Non-Patent Document (Non-Patent Document 1) "AlF3-Coating to Improve High Voltage Cycling Performance of Li[Ni⅓Co⅓Mn⅓]O2 Cathode Materials for Lithium Secondary Batteries,": J. of Electrochem. Soc., 154(3), A168-A172 (2007)

SUMMARY OF THE INVENTION

The present invention has been made in an effort to provide a cathode active material in which the surface of a lithium manganese-excess layered structure composite oxide is doubly coated with a metal fluoride-based material and a metal phosphate-based material.

First, structural stability of the surface of the cathode active material may be secured by a metal fluoride-based internal side coating layer. In this case, the present invention provides a cathode active material which may form a lithium-metal-fluoride (Li-M-F) composite having high ion conductivity by reacting the metal fluoride-based internal side coating layer with Li in a $Li_2MnO_3$ region in the composite oxide to form, and accordingly, may increase mobility of Li by changing a part of $Li_2MnO_3$ into a $LiMn_2O_4$ cubic spinel phase, may reduce an irreversible capacity in a first charge and discharge curve and may maintain high capacity characteristics during charge by activating the oxidation·reduction reaction of kinetically slow Mn during charge and discharge, and may enhance high rate capability and service life characteristics and may also enhance thermal stability.

Next, the present invention provides a cathode active material which prevents elution of Ni and Mn by a metal phosphate-based outer side coating layer and suppresses side reactions with an electrolyte, and maintains the nominal voltage by preventing desorption of oxygen to maintain the reduction reaction of Mn and Ni even after several charge and discharge cycles.

In addition, the present invention provides a method for preparing the aforementioned cathode active material and a secondary battery including the same.

In order to solve the aforementioned problems, the present invention provides the following exemplary embodiments.

In an exemplary embodiment, the present invention provides a cathode active material including: a lithium manganese-excess layered structure composite oxide represented by Formula $Li[Li_{x-z}(Ni_aCo_bMn_c)_{1-x}]O_{2-y}F_y$ (here, a+b+c=1, 0.05≤x≤0.33, 0≤y≤0.08, and 0<z≤0.05); a metal fluoride coating layer coated on a surface of the composite oxide; and a metal phosphate coating layer coated on the metal fluoride coating layer.

In the formula, the cathode active material has a composition in which a cubic spinel structure is easily formed in the cathode active material because the sum of Li and the other metals becomes 1+x−z+1−x=2−z and the cathode active material has a composition which is smaller by the z value than a composition having 2 as a sum of Li and a metal of a layered structure $LiMO_2$ (M=metal).

In the exemplary embodiment, the cathode active material may further include a lithium manganese oxide ($LiMn_2O_4$) having a cubic spinel structure, which is formed by a change in a part of a monoclinic $Li_2MnO_3$ in the composite oxide in the vicinity of the surface of the composite oxide, and in this case, the composite oxide coated with the metal fluoride exhibits a reduction peak on the dQ/dV at 2.8 V to 3.0 V during discharge (the dQ/dV may be obtained by differentiating a capacity of a discharge curve with respect to voltage, in this case, an inflection point of a slope in the discharge curve is exhibited as a reduction peak in the dQ/dV, currently in the case of H-OLO, a reduction peak is exhibited at 3.7 V and 3.0 V to 3.2 V during discharge, and these peaks indicate that Li each enters the vicinity of Ni and Mn, and then a reduction reaction of the corresponding metal ions occurs).

In addition, in the exemplary embodiment, the composite oxide may include a rhombohedral $LiMO_2$ (here, M is Ni, Co, and Mn) and a monoclinic $Li_2MnO_3$, and in this case, the structure of the composite oxide may become a structure such as rhombohedral $LiMO_2$ (R3m)+monoclinic $Li_2MnO_3$ (L2/m)+cubic spinel $LiMn_2O_4$ (Fd3m) due to a surface coating of the metal fluoride.

Furthermore, in the exemplary embodiment, the metal fluoride may be one selected from the group consisting of $AlF_3$, $MgF_2$, $CoF_3$, NaF, and a mixture thereof.

As described above, the metal fluoride as described above is coated on the surface of the composite oxide having the composition of the formula in which a cubic spinel structure is easily formed, and Li is eluted at the interface between the composite oxide and the coating layer of the metal fluoride, thereby forming a cubic spinel structure.

Further, the metal fluoride coating layer is reacted with Li in a monoclinic $Li_2MnO_3$ region in the composite oxide to form a lithium-metal-fluoride (Li-M-F) composite having high ion conductivity, and accordingly, the diffusion and mobility of Li is increased and an oxidation/reduction reaction of kinetically slow Mn during charge and discharge is activated to reduce an irreversible capacity in a first charge and discharge curve, thereby maintaining high capacity characteristics during discharge, enhancing high rate capability and service life characteristics, and enhancing thermal stability.

In addition, in the exemplary embodiment, the metal phosphate as an outer side coating material may be one selected from the group consisting of $AlPO_4$, $Mg_3(PO_4)_2$, $Co_3(PO_4)_2$, and a mixture thereof, and preferably $AlPO_4$.

By the metal phosphate coating layer as described above, elution of Ni and Mn is prevented, side reactions with the electrolyte are suppressed, and the nominal voltage is maintained by preventing desorption of oxygen to maintain a reduction reaction of Ni and Mn even after several charge and discharge cycles.

Furthermore, in the exemplary embodiment, the total content of the metal fluoride coating layer and the metal phosphate coating layer may be 0.5 wt % to 2.0 wt %, and preferably 1.0 wt %, based on the content of the cathode active material.

Further, in the exemplary embodiment, since there is a problem in that when the content of the metal phosphate to be coated is increased, the rate capability deteriorates, the metal phosphate serves as a resistance component, and the characteristics deteriorate, the content of the metal phosphate to be coated may be 1.0 wt % or less, and preferably 0.2 wt % to 0.4 wt %, and the proportion of the weight ratio of the metal fluoride coating layer and the metal phosphate coating layer may be within a range of 1.0<the metal fluoride coating layer/the metal phosphate coating layer <5.0.

Here, as the total content of the coating of the metal fluoride and the metal phosphate is increased, the charge capacity is decreased due to a decrease in amount of the cathode active material which may give out Li ions, but when the metal fluoride and the metal phosphate are coated on the surface in a suitable amount compared to the cathode active material as described above, there is an effect that a cubic spinel structure is formed on the surface of the cathode active material and the actual discharge capacity is increased according to the efficiency enhancement caused by a decrease in irreversible capacity, high rate capability, service life characteristics, and thermal stability are enhanced, and the nominal voltage is maintained even after several charges and discharges. When the content of the entire coating layer is 2.0 wt % or more, a decrease in capacity according to a decrease in content of the cathode active material is increased, which is not preferred, and when the content of the coating layer is 0.5 wt % or less, the coating effect is negligible, which is not preferred.

In addition, in the exemplary embodiment, the specific surface area of the cathode active material may be 2 $m^2$/g to 5 $m^2$/g. When the specific surface area is 5 $m^2$/g or more, a reaction area with an electrolyte is so large that side reactions may easily occur, thereby severely affecting stability, and when the specific surface area is 2 $m^2$/g or less, the reaction area with the electrolyte is so narrow that there occurs a problem in that the capacitance onset deteriorates.

Furthermore, in the exemplary embodiment, the average particle size of the cathode active material may be 2 μm to 4 μm. When the particle size is 4 μm or more, there occurs a problem in that the specific surface area is reduced and the capacitance onset deteriorates, and when the particle size is 2 μm or less, there occurs a problem in that a powder content is increased to decrease a mixture density, and the capacity per volume is severely reduced.

In another exemplary embodiment, the present invention provides a method for preparing a cathode active material including: preparing a lithium manganese-excess layered structure composite oxide represented by Formula Li[Li$_{x-z}$(Ni$_a$Co$_b$Mn$_c$)$_{1-x}$]O$_{2-y}$F$_y$ (here, a+b+c=1, 0.05≤x≤0.33, 0≤y≤0.08, and 0<z≤0.05); performing a primary coating on a surface of the composite oxide with a metal fluoride; and performing a secondary coating on the metal fluoride coating layer with a metal phosphide.

In the exemplary embodiment, the method may further include forming a lithium manganese oxide having a cubic spinel structure between the composite oxide and the metal fluoride coating layer, and the forming may include: forming a lithium-metal-fluoride (Li-M-F) composite by reacting lithium in a monoclinic Li$_2$MnO$_3$ region in the composite oxide with the metal fluoride coating layer; and changing a part of Li$_2$MnO$_3$ in the monoclinic Li$_2$MnO$_3$ region into LiMn$_2$O$_4$ having a cubic spinet structure.

Further, in the exemplary embodiment, the method may further include heat-treating the cathode active material under an inert atmosphere.

In addition, in the exemplary embodiment, the primary coating and the secondary coating may be continuously performed.

Furthermore, in the exemplary embodiment, the total content of the coating layer coated through the primary coating and the secondary coating may be 0.5 wt % to 2.0 wt % based on the content of the cathode active material, and the proportion of the weight ratio of the metal fluoride coating layer coated through the primary coating and the metal phosphate coating layer coated through the secondary coating may be within a range of 1.0<the metal fluoride coating layer/the metal phosphate coating layer <5.0.

Further, in the exemplary embodiment, the metal fluoride may be one selected from the group consisting of AlF$_3$, MgF$_2$, CoF$_3$, NaF, and a mixture thereof, and preferably AlF$_3$, and the metal phosphate may be one selected from the group consisting of AlPO$_4$, Mg$_3$(PO$_4$)$_2$, CO$_3$(PO$_4$)$_2$, and a mixture thereof, and preferably AlPO$_4$.

In yet another exemplary embodiment, the present invention provides a lithium secondary battery including: a cathode including the cathode active material in the first exemplary embodiment; an anode including an anode active material; and an electrolyte present between the cathode and the anode.

A nominal voltage of a discharge curve (1 C and 4.6 V to 2.5 V) of the lithium secondary battery may be 3.6 V or more.

According to the present invention, a lithium-excess layered structure composite oxide electrode and a lithium secondary battery using the electrode may implement high capacity during discharge by reducing an irreversible capacity within 12% during a first charge and discharge, may greatly improve rate capability and service life characteristics, may enhance thermal stability of the secondary battery, and may prevent a decrease in nominal voltage.

In addition, a lithium-excess layered structure composite oxide electrode and a lithium secondary battery, which are prepared according to the present invention, may be charged and discharged at a high voltage of 4.5 V or more, and may significantly reduce gas generation or explosion danger caused by a reduction in capacity and electrolyte decomposition due to continuous charge and discharge.

DETAILED DESCRIPTION

<Cathode Active Material>

Figure 1:
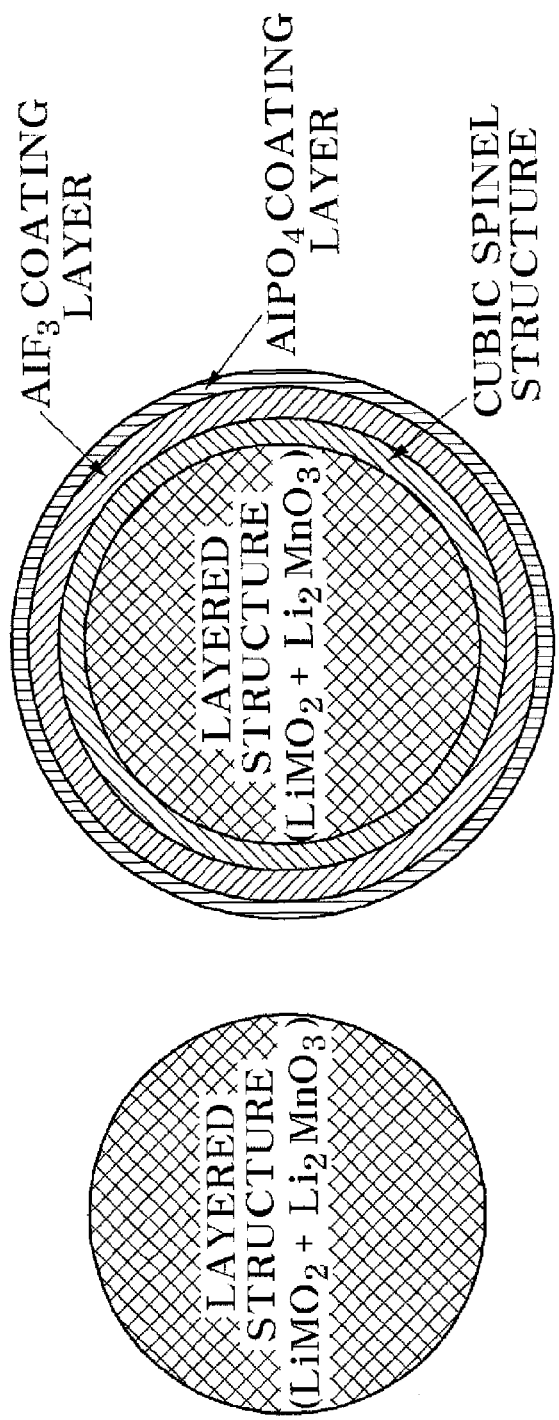
FIG. 1 is a schematic view schematically illustrating a structural change of a cathode active material before coating (Comparative Example 1) and after coating (Example 1).

A cathode active material of the present invention includes: a lithium manganese-excess layered structure composite oxide represented by Formula Li[Li$_{x-z}$(Ni$_a$Co$_b$Mn$_c$)$_{1-x}$]O$_{2-y}$F$_y$ (here, a+b+c=1, 0.05≤x≤0.33, 0≤y≤0.08, and 0<z≤0.05); a metal fluoride coating layer coated on a surface of the composite oxide; and a metal phosphate coating layer coated on the metal fluoride coating layer.

Furthermore, the cathode active material further includes a lithium manganese oxide (LiMn$_2$O$_4$) having a cubic spinel structure, which is formed by a change in a part of the monoclinic Li$_2$MnO$_3$ in the composite oxide in the vicinity of the composite oxide, and in this case, the composite oxide becomes a composite structure of a rhombohedral LiMO$_2$ (R3m; here, M is Ni, Co, and Mn), a monoclinic Li$_2$MnO$_3$ (L2/m), and a cubic spinel LiMn$_2$O$_4$ (Fd3m).

Further, the metal fluoride is one selected from the group consisting of AlF$_3$, MgF$_2$, CoF$_3$, NaF, and a mixture thereof, and preferably AlF$_3$, and the metal phosphate is one selected from the group consisting of AlPO$_4$, Mg$_3$(PO$_4$)$_2$, Co$_3$(PO$_4$)$_2$, and a mixture thereof, and preferably AlPO$_4$.

In addition, the total content of the metal fluoride coating layer and the metal phosphate coating layer is 0.5 wt % to 2.0 wt %, and preferably 1.0 wt %, based on the content of the cathode active material, and the proportion of the weight ratio of the metal fluoride coating layer and the metal phosphate coating layer is within a range of 1.0<metal fluoride coating layer/metal phosphate coating layer <5.0.

Furthermore, in the exemplary embodiment, the specific surface area and the average particle size of the cathode active material are 2 m$^2$/g to 5 m$^2$/g and 2 μm to 4 μm, respectively.

The cathode active material as described above is prepared by the following method for preparing a cathode active material.

<Preparation Method of Cathode Active Material>

A cathode active material according to the present invention is prepared by a method for preparing a cathode active material including: preparing a lithium manganese-excess layered structure composite oxide represented by Formula Li[Li$_{x-z}$(Ni$_a$Co$_b$Mn$_c$)$_{1-x}$]O$_{2-y}$F$_y$ (here, a+b+c=1, 0.05≤x≤0.33, 0≤y≤0.08, and 0<z≤0.05); performing a primary coating on a surface of the composite oxide with a metal fluoride; and performing a secondary coating on the metal fluoride coating layer with a metal phosphide.

The preparing may be performed by various preparation methods such as publicly known co-precipitation methods and sol-gel processes, by which a lithium manganese-excess layered structure composite oxide is prepared, and is not limited to any specific method.

The primary and secondary coatings may be performed through a publicly known surface coating method as long as a coating material may be uniformly coated on the surface of a base material to be coated, and is not limited to any specific method. The coatings may be performed using various methods such as a wet coating using water or an organic solvent and a dry coating, but it is preferred that the primary coating and the secondary coating are continuously performed.

Further, the preparation method further includes forming a lithium manganese oxide having a cubic spinel structure between the composite oxide and the metal fluoride coating layer, and the forming includes: forming a lithium-metal-fluoride (Li-M-F) composite by reacting lithium in a monoclinic $Li_2MnO_3$ region in the composite oxide with the metal fluoride coating layer; and changing a part of $Li_2MnO_3$ in the monoclinic $Li_2MnO_3$ region into $LiMn_2O_4$ having a cubic spinel structure.

In addition, the preparation method further includes heat-treating the cathode active material under an inert atmosphere.

FIG. 1 is a schematic view schematically illustrating the structures of the cathode active material before and after coating, and as illustrated on the left side of FIG. 1, the composite oxide before coating is a composite oxide including a rhombohedral $LiMO_2$ (here, M is Ni, Co, and Mn) and a monoclinic $Li_2MnO_3$.

When a metal fluoride ($AlF_3$) and a metal phosphate ($AlPO_4$) are doubly coated on the surface of the composite oxide as described above, as illustrated on the right side of FIG. 1, a part of $Li_2MnO_3$ in the monoclinic $Li_2MnO_3$ region is change into $LiMn_2O_4$ having a cubic spinel structure to form a $LiMn_2O_4$ layer having a cubic spinet structure at a boundary portion between the composite oxide and the metal fluoride coating layer, and the metal fluoride coating layer and the metal phosphate coating layer are continuously formed on the outer side thereof, while Li in the monoclinic $Li_2MnO_3$ region in the composite oxide is reacted with the metal fluoride to form a lithium-metal-fluoride (Li-M-F) composite.

Figure 2:
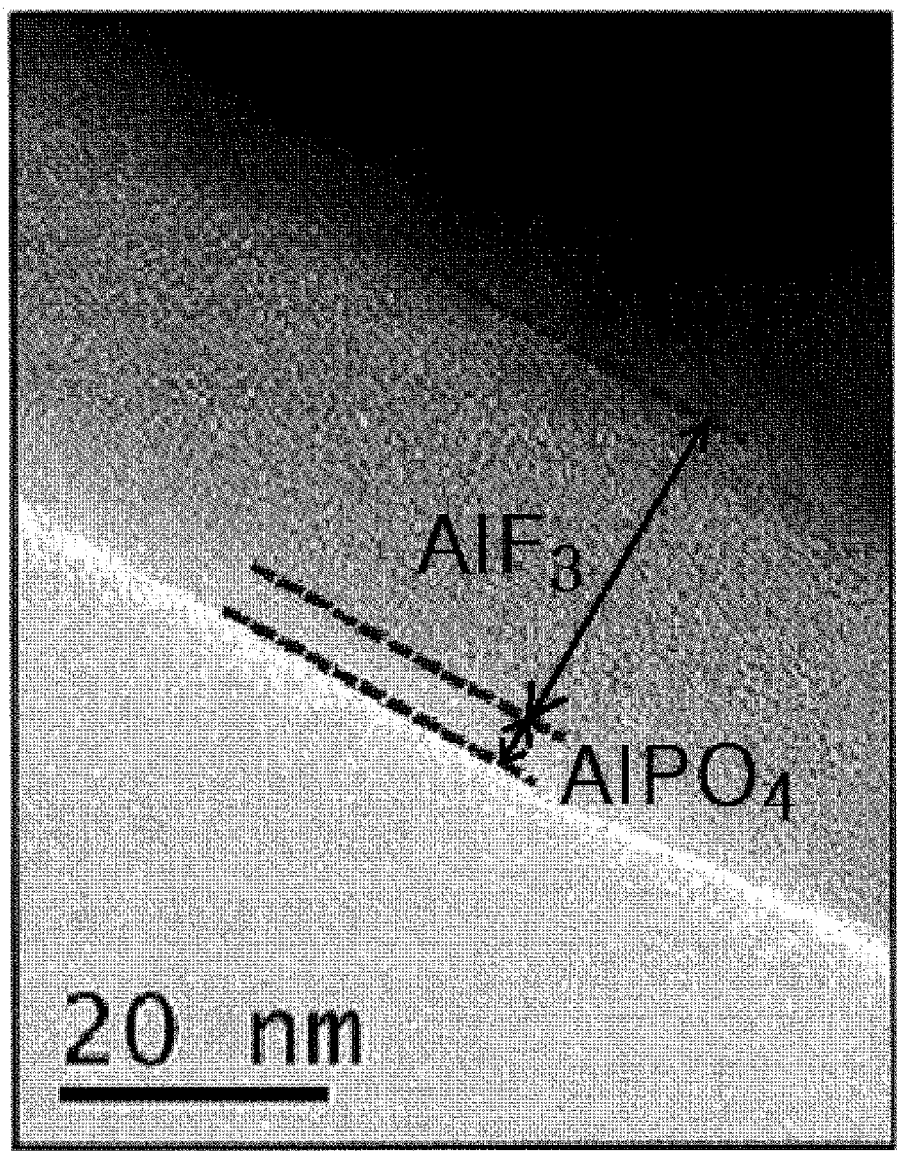
FIG. 2 is a cross-section TEM image of the cathode active material after coating (Example 1).
Figure 3:
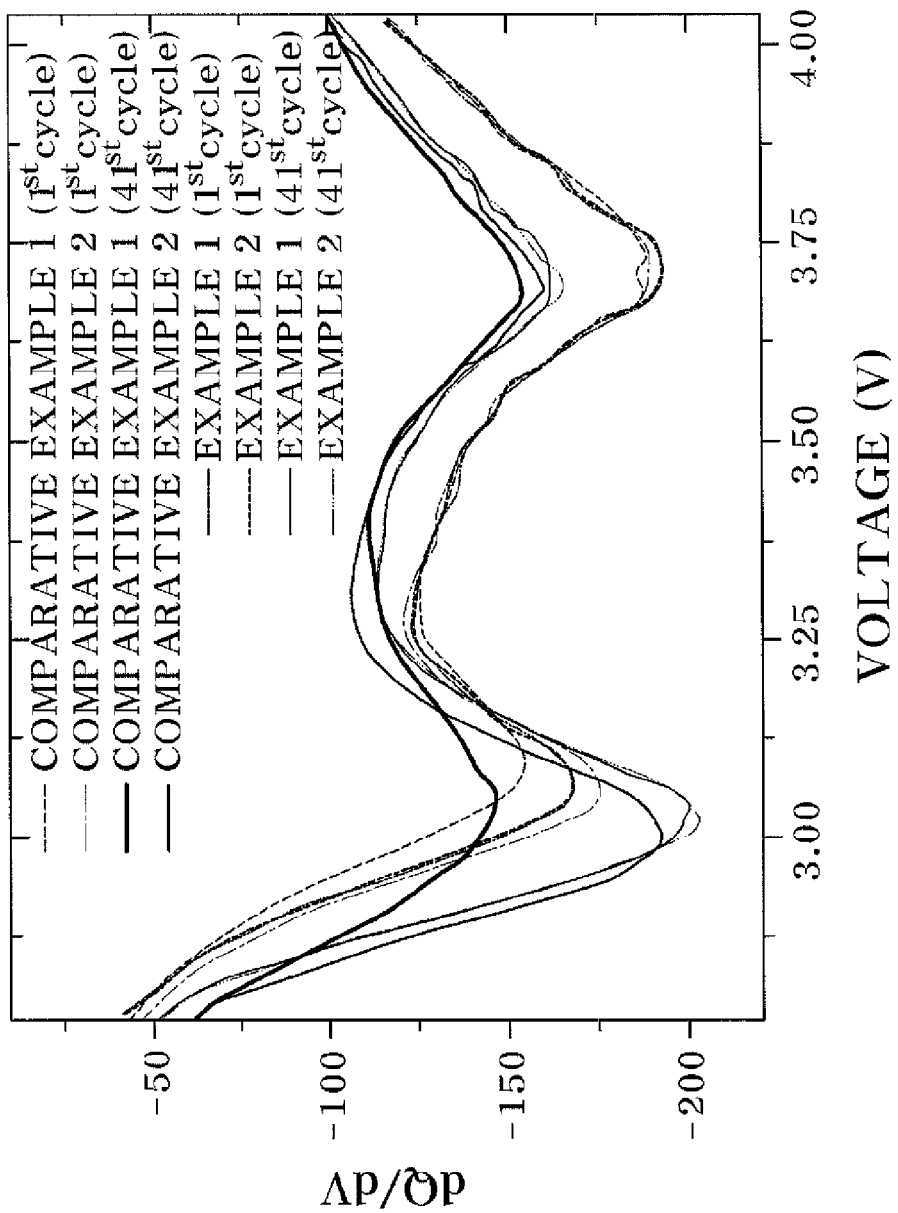
FIG. 3 is a graph illustrating a differential capacity (dQ/dV) of a discharge curve.
Figure 4:
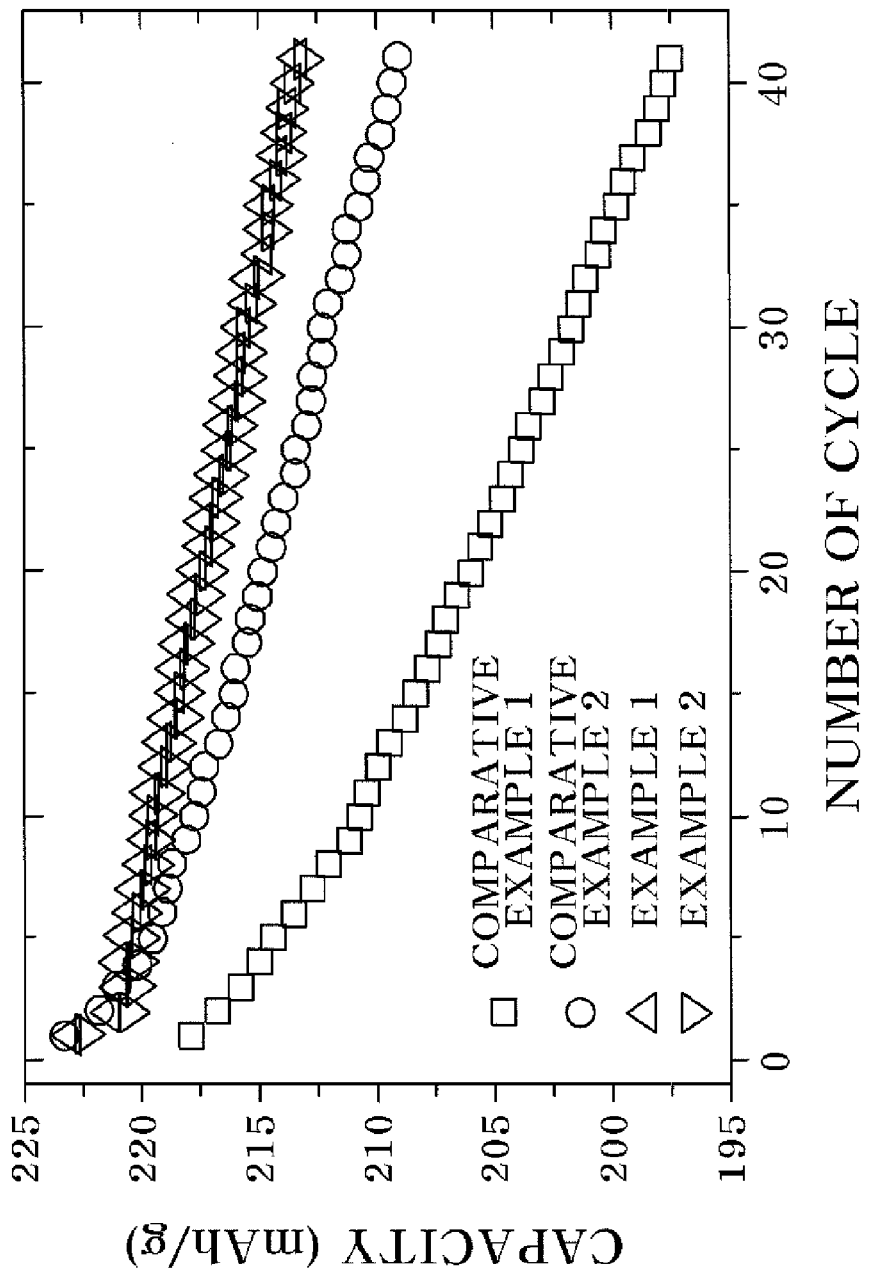
FIG. 4 is a graph illustrating a service life characteristic (discharge capacity (1 C, 41 cycles)).

FIG. 2 is a cross-section TEM image of the cathode active material (Example 1), FIG. 3 is a graph illustrating the differential capacity (dQ/dV) of a discharge curve, and from these drawings, it can be confirmed that a change into a cubic spinel structure occurred at a boundary portion between the composite oxide and the metal fluoride coating layer through a double coating of the metal fluoride and the metal phosphate according to the present invention.

A $LiMn_2O_4$ cubic spinel phase is formed on the surface of the cathode active material coated with the metal fluoride and a reduction peak is exhibited on the dQ/dV at 2.8 V to 3.0 V during discharge, the metal fluoride coating layer is reacted with Li in the monoclinic $Li_2MnO_3$ region in the composite oxide to form a lithium-metal-fluoride (Li-M-F) composite having high ion conductivity, and accordingly, there is an effect that the diffusion and mobility of Li is increased, the oxidation/reduction reaction of kinetically slow Mn during charge and discharge is activated, a large discharge capacity is exhibited even when high current is applied thereto, so as to increase the rate capability, and the capacity maintenance ratio is apparently maintained after 41 cycles in the process of repeating charge and discharge with 1 C.

Furthermore, a cathode active material doubly coated with the metal phosphate has an effect that rate capability and service life characteristics are additionally enhanced as compared to a cathode active material coated with only the metal fluoride, and after a test of the service life, the intensity of the reduction peak is further significantly exhibited on the dQ/dV.

Further, compared to the case where a structural modification occurs due to oxygen produced in the charge and discharge process of the lithium manganese-excess layered structure composite oxide, the case of being doubly coated with the metal fluoride and the metal phosphate has an effect that elution of Ni and Mn is prevented, side reactions with the electrolyte are suppressed, and the nominal voltage is maintained by preventing desorption of oxygen to maintain the reduction reaction of Mn and Ni even after several charge and discharge cycles.

In this case, the total content of the coating layer coated through the primary coating and the secondary coating is 0.5 wt % to 2.0 wt % based on the content of the cathode active material, and the proportion of the weight ratio of the metal fluoride coating layer coated through the primary coating and the metal phosphate coating layer coated through the secondary coating is within a range of 1.0<the metal fluoride coating layer/the metal phosphate coating layer <5.0.

In the exemplary embodiment, the metal fluoride is one selected from the group consisting of $AlF_3$, $MgF_2$, $CoF_3$, NaF, and a mixture thereof, and preferably $AlF_3$, and the metal phosphate is one selected from the group consisting of $AlPO_4$, $Mg_3(PO_4)_2$, $Co_3(PO_4)_2$, and a mixture thereof, and preferably $AlPO_4$.

<Lithium Secondary Battery Including Cathode Active Material>

Since the cathode active material according to the present invention may be utilized as a cathode material for a lithium secondary battery, has the same structure as a publicly known secondary battery except for the cathode active material composition, the crystal structure and the like, and may be prepared by the same publicly known preparation method, the detailed description thereof will be omitted.

Hereinafter, with reference to accompanying drawings, a method for preparing the cathode active material according to the present invention and a lithium secondary battery including the cathode active material prepared by the method will be described in detail through preferred Examples and Comparative Examples. However, these Examples are only a preferred embodiment of the present invention, and it should not be interpreted that the present invention is limited by the Examples.

EXAMPLE 1

① Synthesis of Precursor

Nickel sulfate ($NiSO_4$), cobalt sulfate ($CoSO_4$), and manganese sulfate ($MnSO_4$) are dissolved in water at a ratio of 2:2:6, and then the resulting solution is poured into a 1 M sodium hydroxide (NaOH) solution. Ammonia water ($NH_4OH$) is slowly added to the aforementioned solution at an equivalent ratio which is the same as the solution ratio of the metal. After a continuous type reactor is used to perform a reaction for 12 hours or more, a precipitate formed is filtered, then washed several times with an aqueous solution, and dried at 120° C. in a drying oven, thereby synthesizing a $Ni_{0.2}Co_{0.2}Mn_{0.6}(OH)_2$ precursor.

② Synthesis of Lithium Manganese-Excess Composite Oxide

The precursor synthesized in ① and a nickel cobalt manganese hydroxide ($Ni_{0.2}Co_{0.2}Mn_{0.6}(OH)_2$), and lithium carbonate ($Li_2CO_3$)/lithium fluoride (LiF) are mixed at a stoichiometric ratio of 1:1.4, and then the mixture is fired at 700° C. to 900° C. for 24 hours, thereby synthesizing a powder of a lithium manganese-excess composite oxide represented by Formula $Li[Li_{x-z}(Ni_aCo_bMn_c)_{1-x}]O_{2-y}F_y$ (here, a+b+c=1, $0.05 \leq x \leq 0.33$, $0 \leq y \leq 0.08$, and $0 < z \leq 0.05$).

In the formula, the sum of Li and the metals Ni, Co, and Mn becomes 1+x−z+1−x=2−z, and therefore, a lithium manganese-excess composite oxide is synthesized with a composition in which a cubic spinel structure is easily formed in a cathode active material by coating with a metal fluoride leading to a composition which is smaller by the z value than 2 as a sum of Li and a metal in a layered structure $LiMO_3$ (M=metal).

③ Synthesis of Powder of Cathode Active Material Coated with Metal Fluoride

The composite oxide powder synthesized in ② is put into and distributed well in an aqueous solution in which a metal nitrate (a nitrate of a metal such as Al, Mg, and Co, and $Al(NO_3)$ in Example 1) is dissolved so as to be suitable for a content for coating, and then an $NH_4F$ aqueous solution dissolved so as to be suitable for the stoichiometric ratio is allowed to be reacted with the solution at 80° C. for 1 hour while being added thereto at a rate of 1 ml/min.

④ Synthesis of Powder of Cathode Active Material Coated with Metal Phosphate

An $(NH_4)_2HPO_4$ aqueous solution dissolved so as to be suitable for the stoichiometric ratio is allowed to be reacted with the aqueous solution of a powder coated with the metal fluoride as described in ③ at 80° C. for 4 hours while being added thereto at a rate of 1 ml/min, and then the reaction solution is heated at 120° C. for 2 hours or more and dried. Thereafter, heat treatment is performed at 400° C. under a nitrogen atmosphere for 5 hours or more, thereby obtaining a cathode active material doubly coated with the metal fluoride/the metal phosphate (0.8 wt % $AlF_3$+0.2 wt % $AlPO_4$).

⑤ Evaluation of Battery Characteristics

A slurry is prepared by mixing the coated cathode active material synthesized in ④, Denka Black as a conductive material, and polyvinylidene fluoride (PVDF) as a binder at a ratio of 94:3:3. A cathode electrode plate is manufactured by uniformly coating the slurry on an aluminum (Al) foil.

A 2032 coin cell is manufactured using a lithium metal as an anode and a solution with 1.3 M $LiPF_6$ EC/DMC/EC=3:4:3 as an electrolyte.

A charge and discharge of one cycle is conducted at 0.1 C and 3.0 V to 4.7 V, and thereafter, the rate capability is evaluated through a discharge capacity of 0.33 C and a discharge capacity ratio of 3 C, and after 41 times of charges and discharges at 1 C, service life characteristics are evaluated as a capacity maintenance ratio, and the result is shown in the following Table 1.

EXAMPLE 2

A preparation and an evaluation are performed in the same manner as in Example 1, except that a content or material for coating (0.8 wt % $AlF_3$+0.29 wt % $AlPO_4$) is varied, and the result is shown in the following Table 1.

EXAMPLE 3

A preparation and an evaluation are performed in the same manner as in Example 1, except that a content or material for coating (0.4 wt % $AlF_3$+0.1 wt % $AlPO_4$) is varied, and the result is shown in the following Table 1.

EXAMPLE 4

A preparation and an evaluation are performed in the same manner as in Example 1, except that a content or material for coating (0.8 wt % $MgF_2$+0.4 wt % $Mg_3(PO_4)_2$) is varied, and the result is shown in the following Table 1.

EXAMPLE 5

A preparation and an evaluation are performed in the same manner as in Example 1, except that a content or material for coating (1.5 wt % $AlF_3$+0.5 wt % $AlPO_4$) is varied, and the result is shown in the following Table 1.

COMPARATIVE EXAMPLE 1

Through steps ① and ② of Example 1 without performing coating, a powder of a pristine cathode active material $Li_{1.17}Ni_{0.17}Co_{0.17}Mn_{0.49}O_{1.92}F_{0.08}$ (specific surface area 3 m$^2$/g) is synthesized and an evaluation is performed in the same manner as above, and the result is shown in the following Table 1.

COMPARATIVE EXAMPLE 2

A preparation and an evaluation are performed in the same manner as in Example 1, except that a coating with only a metal fluoride (1.0 wt % $AlF_3$) is performed without coating with a metal phosphate, and the result is shown in the following Table 1.

COMPARATIVE EXAMPLE 3

A preparation and an evaluation are performed in the same manner as in Example 1, except that a content or material for coating (0.2 wt % $AlF_3$+0.1 wt % $AlPO_4$) is varied, and the result is shown in the following Table 1.

COMPARATIVE EXAMPLE 4

A preparation and an evaluation are performed in the same manner as in Example 1, except that a content or material for coating (1.8 wt % $AlF_3$+0.4 wt % $AlPO_4$) is varied, and the result is shown in the following Table 1.

TABLE 1

| Classification | Coating content (wt %) | 1st charge capacity (mAh/g) | 1st discharge capacity (mAh/g) | Irreversible capacity (mAh/g) | 3 C./0.33 C. rate capability (%) | Capacity maintenance ratio (%) after 41 cycles | Nominal voltage (V) |
|---|---|---|---|---|---|---|---|
| Comparative Example 1 | — | 300 | 264 | 36 | 76.3 | 90.5 | 3.678 |
| Comparative Example 2 | 1.0 | 287 | 265 | 22 | 81.7 | 94.3 | 3.677 |
| Example 1 | 1.0 | 291 | 273 | 18 | 83.2 | 95.4 | 3.681 |
| Example 2 | 1.1 | 288 | 271 | 17 | 82.9 | 95.6 | 3.682 |

TABLE 1-continued

| Classification | Coating content (wt %) | 1st charge capacity (mAh/g) | 1st discharge capacity (mAh/g) | Irreversible capacity (mAh/g) | 3 C./0.33 C. rate capability (%) | Capacity maintenance ratio (%) after 41 cycles | Nominal voltage (V) |
|---|---|---|---|---|---|---|---|
| Example 3 | 0.5 | 289 | 266 | 23 | 82.1 | 94.8 | 3.680 |
| Example 4 | 1.2 | 288 | 270 | 18 | 81.8 | 95.0 | 3.682 |
| Comparative Example 3 | 0.3 | 298 | 264 | 34 | 78.2 | 90.9 | 3.678 |
| Example 5 | 2.0 | 284 | 269 | 15 | 82.4 | 94.7 | 3.683 |
| Comparative Example 4 | 2.2 | 280 | 260 | 20 | 79.1 | 91.3 | 3.679 |

As in Examples 1 to 5, it can be confirmed that when the surface of the composite oxide is doubly coated with a metal fluoride and a metal phosphate in appropriate amounts, the irreversible capacity is reduced, and the rate capability and the capacity maintenance ratio after 41 cycles are enhanced compared to Comparative Example 1 in which the surface is coated with none of the metal fluoride and the metal phosphate and Comparative Example 2 in which the surface is coated with only the metal fluoride.

Furthermore, it can be seen that when the total content of the metal fluoride and the metal phosphate coating layers is too low as in Comparative Example 3, the coating effect is not exhibited, and when the total content is too high as in Comparative Example 4, the coating layer serves as a resistance, and the rate capability deteriorates and the capacity is decreased.

What is claimed is:

1. A cathode active material comprising:
   a lithium manganese-excess layered structure composite oxide represented by Formula $Li[Li_{x-z}(Ni_aCo_bMn_c)_{1-x}]O_{2-y}F_y$ (here, a+b+c=1, 0.05<x<0.33, 0<y<0.08, and 0<z<0.05);
   a metal fluoride coating layer coated on a surface of the composite oxide; and
   a metal phosphate coating layer coated on the metal fluoride coating layer.

2. The cathode active material of claim 1, further comprising:
   a lithium manganese oxide ($LiMn_2O_4$) having a cubic spinel structure, which is formed by a change in a part of a monoclinic $Li_2MnO_3$ in the composite oxide in a vicinity of a surface of the composite oxide.

3. The cathode active material of claim 2, wherein the lithium manganese oxide having a cubic spinel structure performs a reduction reaction at 2.8 V to 3.0 V.

4. The cathode active material of claim 1, wherein the composite oxide comprises a rhombohedral $LiMO_2$ (here, M is Ni, Co, and Mn) and a monoclinic $Li_2MnO_3$.

5. The cathode active material of claim 1, wherein a total content of the metal fluoride coating layer and the metal phosphate coating layer is 0.5 wt% to 2.0 wt% based on a content of the cathode active material.

6. The cathode active material of claim 5, wherein a weight ratio of the metal fluoride coating layer and the metal phosphate coating layer is within a range of 1.0 <the metal fluoride coating layer/the metal phosphate coating layer <5.0.

7. The cathode active material of claim 1, wherein the metal fluoride is one selected from the group consisting of $AlF_3$, $MgF_2$, $CoF_3$, NaF, and a mixture thereof.

8. The cathode active material of claim 1, wherein the metal phosphate is one selected from the group consisting of $AlPO_4$, $Mg_3(PO_4)_2$, $Co_3(PO_4)_2$, and a mixture thereof.

9. The cathode active material of claim 1, wherein a content of the metal phosphate coating layer is 1.0 wt % or less.

10. The cathode active material of claim 9, wherein a content of the metal phosphate coating layer is 0.2 wt % to 0.4 wt %.

11. A method for preparing a cathode active material comprising:
    preparing a lithium manganese-excess layered structure composite oxide represented by Formula $Li[Li_{x-z}(Ni_aCo_bMn_c)_{1-x}]O_{2-y}F_y$ (here, a+b+c=1, 0.05<x<0.33, 0<y<0.08, and 0<z<0.05);
    performing a primary coating on a surface of the composite oxide with a metal fluoride; and
    performing a secondary coating on the metal fluoride coating layer with a metal phosphide.

12. The method of claim 11, further comprising:
    forming a lithium manganese oxide having a cubic spinel structure between the composite oxide and the metal fluoride coating layer.

13. The method of claim 12, wherein the forming comprises:
    forming a lithium-metal-fluoride (Li-M-F) composite by reacting lithium in a monoclinic $Li_2MnO_3$ region in the composite oxide with the metal fluoride coating layer; and
    changing a part of $Li_2MnO_3$ in the monoclinic $Li_2MnO_3$ region into $LiMn_2O_4$ having a cubic spinel structure.

14. The method of claim 11, further comprising:
    heat-treating the cathode active material under an inert atmosphere.

15. The method of claim 11, wherein the primary coating and the secondary coating are continuously performed.

16. The method of claim 11, wherein a total content of the coating layer coated through the primary coating and the secondary coating is 0.5 wt % to 2.0 wt % based on the content of the cathode active material.

17. The method of claim 11, wherein a weight ratio of the metal fluoride coating layer coated through the primary coating and the metal phosphate coating layer coated through the secondary coating is within a range of 1.0<the metal fluoride coating layer/the metal phosphate coating layer <5.0.

18. The method of claim 11, wherein the metal fluoride is one selected from the group consisting of $AlF_3$, $MgF_2$, $CoF_3$, NaF, and a mixture thereof.

19. The method of claim 11, wherein the metal phosphate is one selected from the group consisting of $AlPO_4$, $Mg_3(PO_4)_2$, $Co_3(PO_4)_2$, and a mixture thereof.

20. A lithium secondary battery comprising:
    a cathode comprising the cathode active material of claim 1;
    an anode comprising an anode active material; and
    an electrolyte present between the cathode and the anode.

21. The lithium secondary battery of claim 20, wherein a nominal voltage of a discharge curve (1 C and 4.6 V to 2.5 V) is 3.6 V or more.

\* \* \* \* \*